(12) United States Patent
Wang et al.

(10) Patent No.: US 12,155,420 B2
(45) Date of Patent: Nov. 26, 2024

(54) UNDERWATER ACOUSTIC COMMUNICATION SYSTEM BASED ON FILTER BANK JOINT SUB-CARRIER MULTIDIMENSIONAL INDEX MODULATION AND METHOD THEREOF

(71) Applicant: JIANGSU UNIVERSITY OF SCIENCE AND TECHNOLOGY, Jiangsu (CN)

(72) Inventors: Biao Wang, Jiangsu (CN); Yunan Zhu, Jiangsu (CN); Fangtong Xie, Jiangsu (CN); Tao Fang, Jiangsu (CN); Youwen Zhang, Jiangsu (CN)

(73) Assignee: JIANGSU UNIVERSITY OF SCIENCE AND TECHNOLOGY, Jiangsu (CN)

( * ) Notice: Subject to any disclaimer, the term of this patent is extended or adjusted under 35 U.S.C. 154(b) by 0 days.

(21) Appl. No.: 18/029,104

(22) PCT Filed: Dec. 31, 2021

(86) PCT No.: PCT/CN2021/143600
§ 371 (c)(1),
(2) Date: Mar. 29, 2023

(87) PCT Pub. No.: WO2023/115638
PCT Pub. Date: Jun. 29, 2023

(65) Prior Publication Data
US 2024/0364429 A1    Oct. 31, 2024

(30) Foreign Application Priority Data
Dec. 23, 2021  (CN) .......................... 202111590438.6

(51) Int. Cl.
*H04B 11/00* (2006.01)
*H04B 13/02* (2006.01)
*H04L 27/26* (2006.01)

(52) U.S. Cl.
CPC ............. *H04B 11/00* (2013.01); *H04B 13/02* (2013.01); *H04L 27/26* (2013.01)

(58) Field of Classification Search
CPC .......... H04B 11/00; H04B 13/02; H04L 27/26
(Continued)

(56) References Cited

U.S. PATENT DOCUMENTS

| 12,015,513 B2* | 6/2024 | Cassiau | .................... H03M 9/00 |
| 2015/0063507 A1* | 3/2015 | Dore | .................... H04L 27/2601 |
| | | | 375/348 |

(Continued)

FOREIGN PATENT DOCUMENTS

| CN | 111355677 | 6/2020 |
| CN | 113259295 | 8/2021 |

OTHER PUBLICATIONS

Jian Zhang et al., "Optimised index modulation for filter bank multicarrier system" IET Communications, Mar. 2017, pp.459-467.
Wu Wang et al., "Research on FBMC underwater acoustic communication technology based on index modulation", Electronic Measurement Technology, Jul. 2020, submit with English abstract, pp. 1-4.
"International Search Report (Form PCT/ISA/210) of PCT/CN2021/143600," mailed on Sep. 22, 2022, pp. 1-4.
(Continued)

*Primary Examiner* — Daniel L Murphy
*Assistant Examiner* — Amie M Ndure
(74) *Attorney, Agent, or Firm* — JCIPRNET (57) ABSTRACT

Disclosed is an underwater acoustic communication system based on a filter bank joint sub-carrier multidimensional index modulation and a method thereof. The system includes a transmitting terminal and a receiving terminal, the method is: conducting a joint index modulation at the transmitting terminal, firstly selecting an activated prototype pulse index by using a part of bits of a FBMC symbol, grouping the remaining transmitted information bits and all sub-carriers;

(Continued)

using a part of the bits in each group to select the activated sub-carrier index, modulating the remaining bits to the activated sub-carriers by a constellation symbol mapping, forming a transmission signal after a filter bank modulation; and demodulating three parts of transmitted bits at a receiving terminal after an action of underwater acoustic channel, and recovering the original data bits by combining each part of decoding results.

10 Claims, 6 Drawing Sheets

(58) Field of Classification Search
USPC .......................................................... 367/137
See application file for complete search history.

(56) References Cited

U.S. PATENT DOCUMENTS

| | | | |
|---|---|---|---|
| 2015/0146770 A1* | 5/2015 | Dore | H04L 27/2647 |
| | | | 375/232 |
| 2018/0083814 A1* | 3/2018 | Dore | H04L 27/2633 |
| 2018/0183641 A1* | 6/2018 | Lin | H04L 27/264 |
| 2018/0254937 A1* | 9/2018 | Dore | H04L 27/2698 |

OTHER PUBLICATIONS

"Written Opinion of the International Searching Authority (Form PCT/ISA/237) of PCT/CN2021/143600," mailed on Sep. 22, 2022, pp. 1-4.

* cited by examiner

Channel dispersion characteristics

Pulse dispersion characteristics

FIG. 6

UNDERWATER ACOUSTIC COMMUNICATION SYSTEM BASED ON FILTER BANK JOINT SUB-CARRIER MULTIDIMENSIONAL INDEX MODULATION AND METHOD THEREOF

CROSS-REFERENCE TO RELATED APPLICATION

This application is a 371 of international application of PCT application serial no. PCT/CN2021/143600, filed on Dec. 31, 2021, which claims the priority benefit of China application no. 202111590438.6, filed on Dec. 23, 2021. The entirety of each of the above mentioned patent applications is hereby incorporated by reference herein and made a part of this specification.

TECHNICAL FIELD

The present disclosure relates to the technical field of underwater acoustic communication, and in particular to an underwater acoustic communication system based on a filter bank joint sub-carrier multidimensional index modulation (MIM) and a method thereof.

BACKGROUND

Multi-carrier modulation technology is capable of transforming a high-speed serial transmission into a low-speed parallel transmission, which increases a symbol duration, and greatly reduces a degree of an inter-symbol interference. Relevant technologies are widely used in the underwater acoustic communication and become a new generation of wireless communication standards. Multi-carrier efficient underwater acoustic communication technology system represented by orthogonal frequency division multiplexing (OFDM) has become increasingly mature. Pulses with good time-frequency localization characteristics are taken as a filter bank of a system, which are introduced into Filter bank multi-carrier (FBMC) technology. Compared with rectangular pulses of the OFDM, centralized characteristics of FBMC pulses are quite fine in both time domains and frequency domains, so that cyclic-prefix is no longer needed, and spectral efficiencies of the system is greatly improved. However, in current underwater acoustic multi-carrier communication technology, whether the OFDM system or the FBMC system is adopted, only a traditional MPSK method and a QAM digital modulation method are still adopted in terms of signal initial modulation. Information obtained by these digital modulation methods is at most two-dimensional information (amplitude dimension and phase dimension). In fact, a dimension of a digital modulation is capable of being increasing by an index modulation to effectively improve system performances.

A combination of the index modulation and a multi-carrier is capable of effectively improving spectral efficiencies of the system, which are proved theoretically in the field of terrestrial wireless communication. At present, researches on the combination of the index modulation and the underwater acoustic multi-carrier communication mainly focus on an index of activated states of the sub-carriers. However, as a spatial modulation method to increase information dimension, the index modulation technology should have a more generalized index mapping scheme.

SUMMARY

The objectives of the present disclosure are to eliminate the problems and the deficiencies in the prior art, and to provide an underwater acoustic communication system based on a filter bank joint sub-carrier multidimensional index modulation and a method thereof.

The present disclosure establishes a space-frequency two-dimensional combined index mapping to prototype pulses and sub-carrier states. Part of transmitted bits are hidden in a filter bank and activated positions information of the activated sub-carrier by a combination design of the index mapping scheme, which are not only capable of flexibly selecting basis functions of a transceiver filter bank to match complex time-varying underwater acoustic channel states, thus reducing a system error rate, but also realize the sub-carrier states control to further improve a frequency band utilization and an anti-interference ability of the system, and effectively improve performances of the underwater acoustic multi-carrier communication system.

In order to achieve the above objectives, the following technical solutions of the present disclosure are adopted.

Provided is an underwater acoustic communication system based on a filter bank joint sub-carrier multidimensional index modulation, which includes a transmitting terminal and a receiving terminal.

The transmitting terminal includes a prototype pulse index module, a bit shunt, a carrier state index module, a constellation mapping module, a FBMC block generator and a filter bank modulation module.

The receiving terminal includes an equalizer, a detector, a decoder and a bit combiner.

Bit input signals are taken as input signals of the prototype pulse index module and input signals of the bit shunt, respectively. Output signals of the prototype pulse index module are transmitted to the filter bank modulation module. Output signals of the bit shunt are transmitted to the carrier state index module and the constellation mapping module respectively. Output signals of the carrier state index module and output signals of the constellation mapping module are all transmitted to the FBMC block generator. Output signals of the FBMC block generator are transmitted to the filter bank modulation module. Output signals of the filter bank modulation module are taken as output signals of the transmitting terminal.

The output signals of the transmitting terminal are taken as input signals of the equalizer. Output signals of the equalizer are transmitted to the detector. Output signals of the detector are transmitted to the decoder. Output signals of the decoder are transmitted to the bit combiner. Output signals of the bit combiner are taken as output signals of the receiving terminal.

Further, the detector includes a prototype pulse detection module, a sub-carrier basis function module, a FBMC block classifier, a carrier state detection module, and a symbol detection module.

Further, the decoder includes a filter index decoding module, a sub-carrier index decoding module and a constellation symbol decoding module.

The output signals of the equalizer are transmitted to the prototype pulse detection module. Output signals of the prototype pulse detection module are transmitted to the sub-carrier basis function module. Output signals of the sub-carrier basis function module are transmitted to the FBMC block classifier and the filter index decoding module respectively. Output signals of the FBMC block classifier are transmitted to the carrier state detection module. Output signals of the carrier state detection module are transmitted to the symbol detection module. Output signals of the symbol detection module are transmitted to the sub-carrier index decoding module and the constellation symbol decoding module respectively. Output signals of the sub-carrier index decoding module, output signals of the constellation symbol decoding module and output signals of the filter index decoding module are all transmitted to the bit combiner.

Provided is a communication method for the underwater acoustic communication system based on the filter bank joint sub-carrier multidimensional index modulation. The method includes a transmitting method and a receiving method.

Steps of the transmitting method lie in the following.

In Step 1, a part of bits in a transmitted binary bit system are for selecting a activated prototype pulse index, remaining bits are evenly grouped through a bit shunt and all the sub-carriers. A part of bits in each group are for selecting an activated sub-carrier index. The part of bits are mapped to activated sub-carriers after a quadrature amplitude modulation, and complete transmission data are formed by each group of data after passing through the FBMC block generator.

In Step 2, a real part and an imaginary part of a mapped complex constellation symbol are interleaved with each other for a 1/2 period. A filter-bank multi-carrier modulation is conducted by a filter selected by the prototype pulse index in Step 1. Transmission signals are formed and sent into an underwater acoustic channel is formed for transmission. Steps of the receiving method lie in the following.

In Step 3, received signals after a channel equalization are demodulated and decoded at a receiving terminal, and eventually outputs are combined to restore an original transmitted binary bit stream.

Further, in Step 1, a total number of the sub-carriers M of a system and a total number of input bits A in a system are determined according to communication requirements. $p_1$ bits are for selecting an activated filter prototype pulse index, and remaining B bit information is evenly divided into G groups through the bit shunt and the sub-carriers, bit information $p=p_2+p_3$ in each group is mapped to a sub-carrier group with a length of K, $A=p_1+B=p_1+(p_2+p_3)G$, $G=M/K=B/p$; only L sub-carriers in each group are activated for transmitting a constellation symbol, and remaining silent sub-carriers are zeroed, $p_2$ bits are for selecting the activated sub-carriers index, and $p_3$ bits are modulated to active sub-carriers after being formed into the complex symbol through a constellation mapping.

Further, each part of the bits are $p_1=\lfloor \log_2 N_f \rfloor$, $p_2=\lfloor \log_2 C_K^L \rfloor$, $p_3=L \log_2 Q$, where $\lfloor \cdot \rfloor$ represents a floor function, that is the bit number of $p_1$ depends on all alternative prototype filter types $N_f$, the bit number of $p_2$ depends on all possible sub-carrier combinations $C_K^L$, the bit number of $p_3$ depends on a number L of the active sub-carriers in each group and a modulation dimension Q of the constellation mapping.

Further, the $p_1$ bits are output as an activated filter serial number $F_n \in [1,2,K, N_f]$ of a n-th FBMC symbol after passing through the prototype pulse index module. The $p_2$ bits are output as an activated sub-carrier serial number $I_g=\{i_{g,1},i_{g,2},L,i_{g,L}\}$, $i_{g,l} \in [1,2,L,K]$, g=1,K,G and l=1,K,L after passing through the carrier state index module. The $p_3$ bits are output as L symbols $s_g=\{s_{g,1}, s_{g,2}, K, s_{g,L}\}$, $s_{g,l} \in \zeta$, g=1,K,G and l=1,K,L after the constellation mapping, where $\zeta$ represents a Q-dimensional constellation set.

Further, output data for the FBMC block generator in Step 1 are $x=[x(0),K,x(M-1)]$, $x(m) \in \{0,\zeta\}$ and m=0,K,M-1.

Further, composite index modulated transmission signals modulated by a basis function $g_n(t)$ of a No. $F_n$ filter in Step 2 are represented as $$s(t) = \sum_{m=0}^{M-1} \sum_{n=0}^{+\infty} e^{j2\pi m v t} e^{j\varphi_{m,n}} \left\{ a_{m,n} g_n(t-nT) + jb_{m,n} g_n\left(t-\frac{T}{2}-nT\right) \right\},$$

where an additional phase is $$\varphi_{m,n} = \frac{\pi}{2} m,$$

a sub-carrier interval v and a symbol period T satisfy v=1/T, $a_{m,n}$ and $b_{m,n}$ are a real part and an imaginary part of x(m), a part of $a_{m,n}$ and $b_{m,n}$ are capable of being 0 because of an introduction of the silent sub-carriers.

Further, in Step 3, an equalization result $\bar{y}$ of received signals is sent to the detector, and a detection process is divided into following steps.

In Step 1, a prototype pulse detection is conducted. Filter bank basic function index information $\hat{F}_n$ is determined by a maximum likelihood detection, and a filter bank demodulation is conducted on $\bar{y}$.

In Step 2, each group of the received signals $y_1 \sim y_G$ is obtained through a FBMC block classifier.

In Step 3, a sub-carrier state detection is conducted by grouping. Active sub-carrier index information $\hat{I}_g$ in each group is determined by a maximum likelihood criterion, and data symbols carried on the active sub-carriers are taken as a constellation symbol $\hat{s}_g$ to be decoded at the same time.

Further, in Step 3, $\hat{F}_n$, $\hat{I}_g$ and $\hat{s}_g$ are transmitted to the filter index decoding module, the sub-carrier index decoding module and the constellation symbol decoding module respectively to obtain corresponding bits, the corresponding bits are combined through the bit combiner to obtain a restored transmitted bit stream.

The advantages and the beneficial effects of the present disclosure lie in the following.

The present disclosure jointly indexes a carrier index and the FBMC prototype pulse selection, through the combined design of the index mapping scheme, it can not only realize the state control on the system sub-carrier, make it have better frequency band utilization, but also realize the type selection on the prototype pulse, flexibly match the complex underwater acoustic channel characteristics, and further improve the system performance. The realization of the present disclosure can provide a research idea of high-speed anti-interference multi-carrier system under a new modulation mode for the underwater acoustic communication field.

DETAILED DESCRIPTION OF THE EMBODIMENTS

In order to further clarify the objectives, the technical solutions and the advantages of the embodiments in the present disclosure, the technical solutions in the embodiments of the present disclosure will be described clearly and completely with reference to the accompanying drawings in the embodiments of the present disclosure, and it will be apparent that the described embodiments are some, but not all embodiments of the present disclosure. Based on the embodiments of the present disclosure, all other embodiments, which can be derived by a person skilled in the art from the embodiments given herein without making any creative effort, shall fall within the protection scope of the present disclosure.

Figure 1:
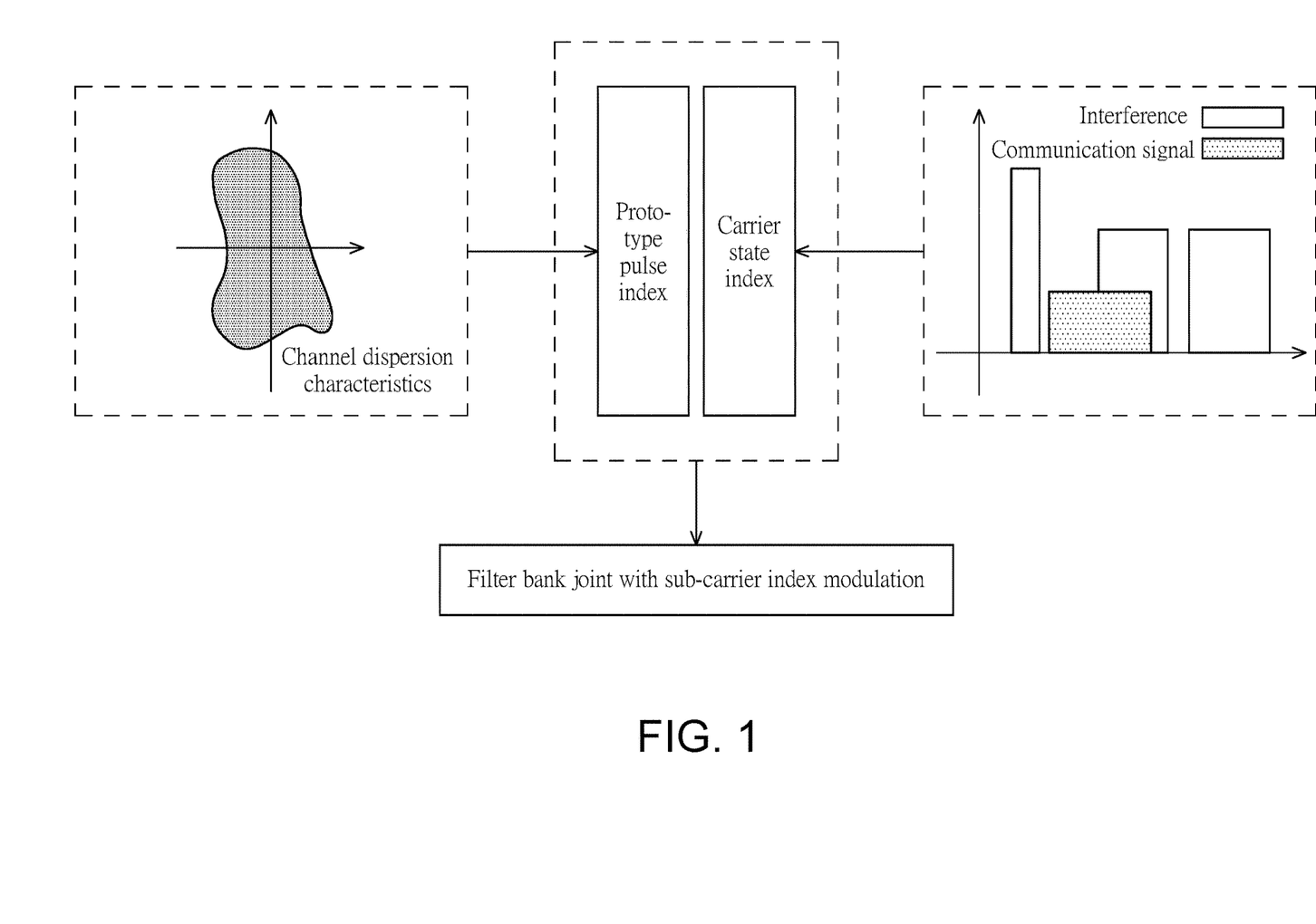
FIG. 1 illustrates a schematic diagram of a filter bank joint sub-carrier multidimensional index modulation method.

Provided is an underwater acoustic communication system based on a filter bank joint sub-carrier multidimensional index modulation and a method thereof. As illustrated in FIG. 1, the multi-dimensional index modulation method disclosed in the present disclosure combines the prototype pulse index mapping of the filter bank and the sub-carrier state index mapping, which is an index modulation with a combination of the spatial domain and the frequency domain. The communication system includes a transmitting terminal and a receiving terminal.

Figure 2:
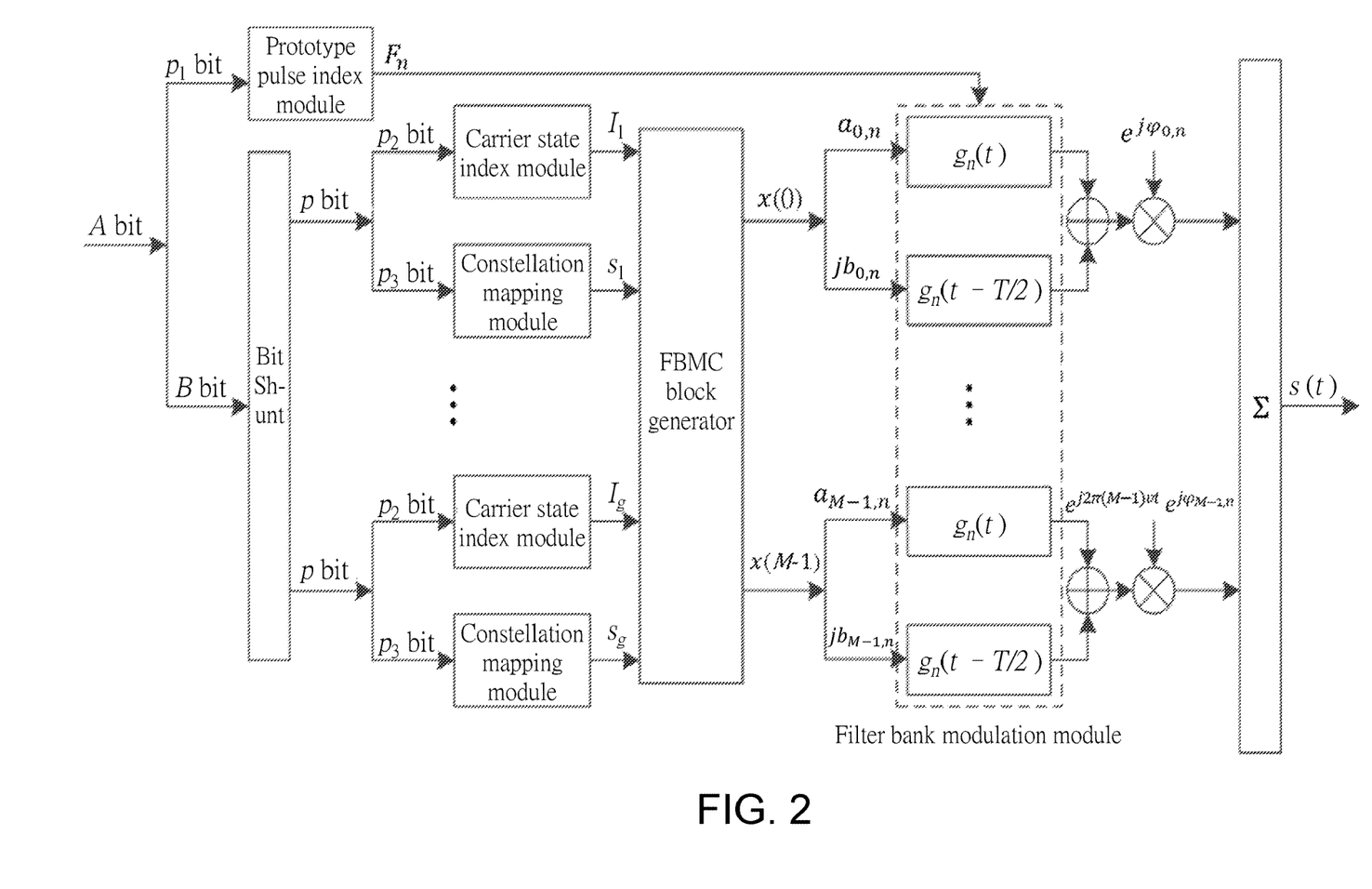
FIG. 2 illustrates a block diagram of a transmitting terminal in an underwater acoustic communication system based on a filter bank joint sub-carrier multidimensional index modulation.

As illustrated in FIG. 2, the transmitting terminal includes a prototype pulse index module, a bit shunt, a carrier state index module, a constellation mapping module, a FBMC block generator and a filter bank modulation module. A total number of the sub-carriers M and a total number of input bits A in a system are determined according to communication requirements.

The binary bit stream has $p_1$ bits, which are for selecting the activated filter prototype pulse index, where $p_1 = \lfloor \log_2 N_f \rfloor$, and $\lfloor \cdot \rfloor$ represents a floor function, that is the bit number of the $p_1$ depends on all alternative prototype filter types $N_f$. The $p_1$ bits are output as an activated filter serial number $F_n \in [1,2,K,N_f]$ of a n-th FBMC symbol after passing through the prototype pulse index module.

The remaining B bit information is evenly divided into G groups through the bit shunt and the sub-carriers, bit information $p = p_2 + p_3$ in each group is mapped to a sub-carrier group with a length of K, $A = p_1 + B = p_1 + (p_2 + p_3)G$, $G = M/K = B/p$; only L sub-carriers in each group are activated for transmitting a constellation symbol, and remaining silent sub-carriers are zeroed, $p_2$ bits are for selecting the activated sub-carriers index, and $p_3$ bits are modulated to active sub-carriers after being formed into the complex symbols through a constellation mapping. $p_2 = \lfloor \log_2 C_K^L \rfloor$ and $p_3 = L \log_2 Q$, where the bit number of $p_2$ depends on all possible sub-carrier combinations $C_K^L$, the bit number of $p_3$ depends on the number L of the active sub-carriers in each group and a modulation dimension Q of the constellation mapping. The $p_2$ bits are output as an activated sub-carrier serial number $I_g = \{i_{g,1}, i_{g,2}, K, i_{g,L}\}$, $i_{g,l} \in [1,2,L,K]$, $g = 1,L,G$ and $l = 1,K,L$ after passing through the carrier state index module. The $p_3$ bits are output as L symbols $s_g = \{s_{g,1}, s_{g,2} K, s_{g,L}\}$, $s_{g,l} \in \zeta$, $g = 1,K,G$ and $l = 1 K,L$ after the constellation mapping, where $\zeta$ represents a Q-dimensional constellation set

TABLE 1

A table of the prototype pulse index mapping when $N_f = 4$ in the embodiments of the present disclosure

| $p_1$ | $F_n$ | Prototype pulse |
|---|---|---|
| 00 | 1 | PHYDYAS filter |
| 01 | 2 | EGF filter ( $\alpha < 1$ ) |
| 10 | 3 | IOAT filter |
| 11 | 4 | EGF filter ( $\alpha > 1$ ) |

TABLE 2

A table of the carrier state index mapping when $C_K^L = C_4^2$ in the embodiments of the present disclosure

| Combination serial number | $p_2$ | $I_g$ | Carrier states |
|---|---|---|---|
| $C_1$ | 00 | {1, 2} | $[s_{g,1}, s_{g,2}, 0, 0]^T$ |
| $C_2$ | 01 | {1, 3} | $[s_{g,1}, 0, s_{g,2}, 0]^T$ |
| $C_3$ | 10 | {1, 4} | $[s_{g,1}, 0, 0, s_{g,2}]^T$ |
| $C_4$ | 11 | {2, 3} | $[0, s_{g,1}, s_{g,2}, 0]^T$ |
| $C_5$ | — | — | $[0, s_{g,1}, 0, s_{g,2}]^T$ |
| $C_6$ | — | — | $[0, 0, s_{g,1}, s_{g,2}]^T$ |

Considering the prototype pulse index mapping $N_f = 4$ as shown in Table 1 and the carrier state index mapping situation $N_f = 4$ as shown in Table 2 (selecting $C_1 \sim C_4$ from six types of the carrier combinations), each FBMC symbol contains M=512 sub-carriers and the constellation symbol adopts the 4QAM modulation. At this time, $p_1 = 2$, $p_2 = 2$, $p_3 = 4$ and G=128, which is capable of calculating that 770 bit information is needed to be transmitted to generate one FBMC symbol by the transmitting terminal.

Output data for the FBMC block generator is $x = [x(0), K, x(M-1)]$, $x(m) = \{0, \zeta\}$ and $m = 0, K, M-1$. Composite index modulated transmission signals modulated by a basis function $g_n(t)$ of a No. $F_n$ filter are represented as $$s(t) = \sum_{m=0}^{M-1} \sum_{n=0}^{+\infty} e^{j2\pi m v t} e^{j\varphi_{m,n}} \left\{ a_{m,n} g_n(t - nT) + j b_{m,n} g_n\left(t - \frac{T}{2} - nT\right) \right\},$$

where an additional phase is $$\varphi_{m,n} = \frac{\eta}{2} m,$$

a sub-carrier interval v and a symbol period T satisfy $v = 1/T$, $a_{m,n}$ and $b_{m,n}$ are a real part and an imaginary part of $x(m)$, a part of $a_{m,n}$ and $b_{m,n}$ are capable of being 0 because of an introduction of the silent sub-carriers.

Figure 3:
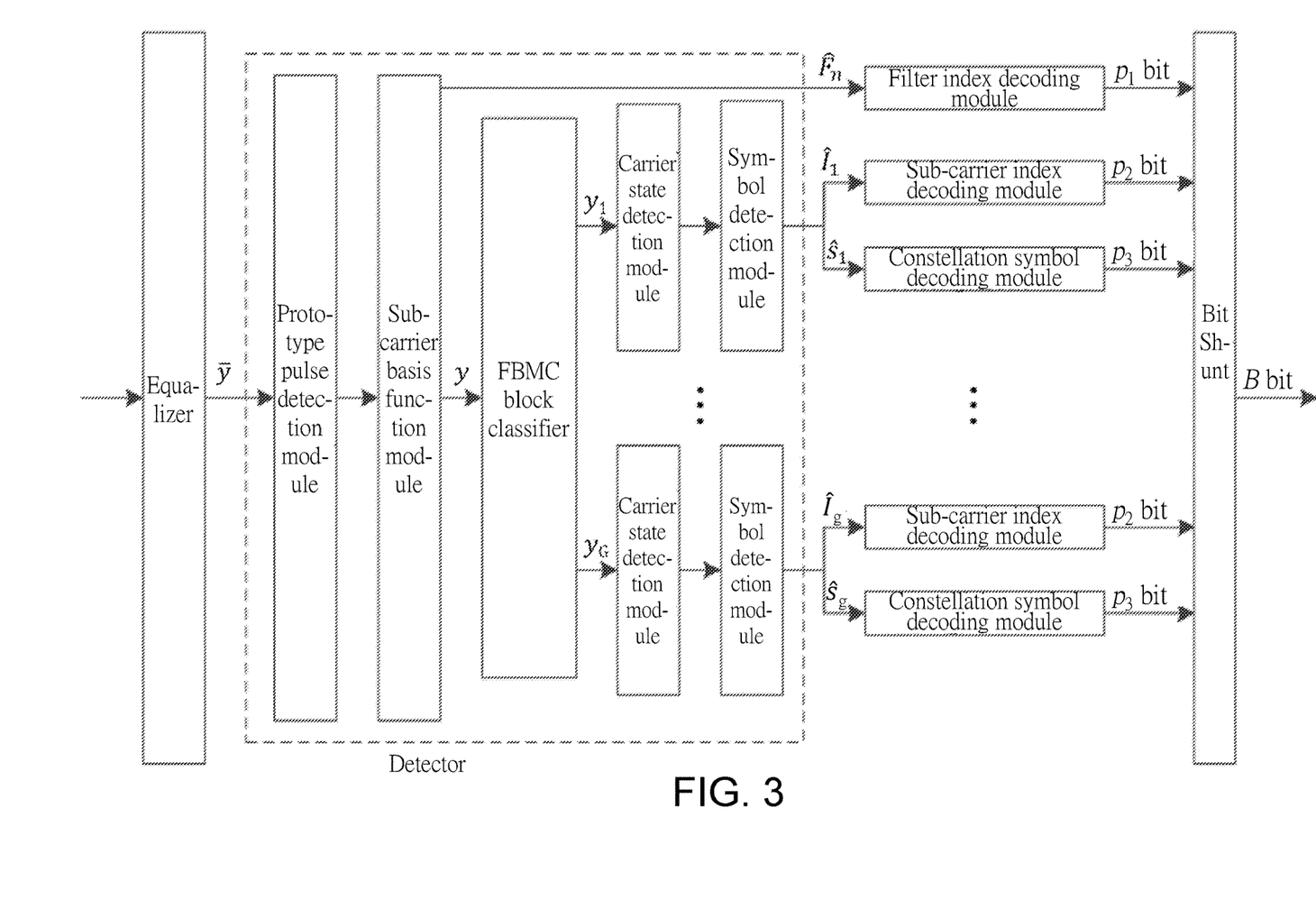
FIG. 3 illustrates a block diagram of a receiving terminal in the underwater acoustic communication system based on the filter bank joint sub-carrier multidimensional index modulation.

As illustrated in FIG. 3, the receiving terminal includes an equalizer, a detector, a FBMC block classifier, a decoder and a bit combiner. The detector includes a prototype pulse detection module, a sub-carrier basis function module, a carrier state detection module, and a symbol detection module. The decoder includes a filter index decoding module, a sub-carrier index decoding module and a constellation symbol decoding module. An equalization result $\bar{y}$ of received signals is sent to the detector at the receiving terminal. Firstly, a prototype pulse detection is conducted, and filter bank basic function index information $\hat{F}_n$ is determined by a maximum likelihood detection, $$\{\hat{F}_n\} = \arg \min_{g_n \in \eta} \|\bar{y} - x * g_n\|^2,$$

where $\eta$ is a set of $N_f$ prototype filter bank basis functions. A demodulation is conducted on $\bar{y}$ by a $\hat{F}_n$ analysis filter bank to obtain y. Each group of the received signals $y_1 \sim y_G$ is obtained through a FBMC block classifier. A sub-carrier state detection is conducted by grouping. Active sub-carrier index information $\hat{I}_g$ in each group is determined by a maximum likelihood criterion. The carried symbols have values of 0 and non-0 are considered by the maximum likelihood detection, and the index position is determined by comparing the posterior probability. L sub-carriers with a higher posterior probability are determined as activated sub-carriers, and the remaining sub-carriers are silent sub-carriers. Data symbols carried on the active sub-carriers are taken as a constellation symbol $\hat{s}_g$ to be decoded at the same time.

$\hat{F}_n$, $\hat{I}_g$ and $\hat{s}_g$ are transmitted to the filter index decoding module, the sub-carrier index decoding module and the constellation symbol decoding module respectively to obtain corresponding bits, the corresponding bits are combined through the bit combiner to obtain a restored transmitted bit stream.

Figure 4:
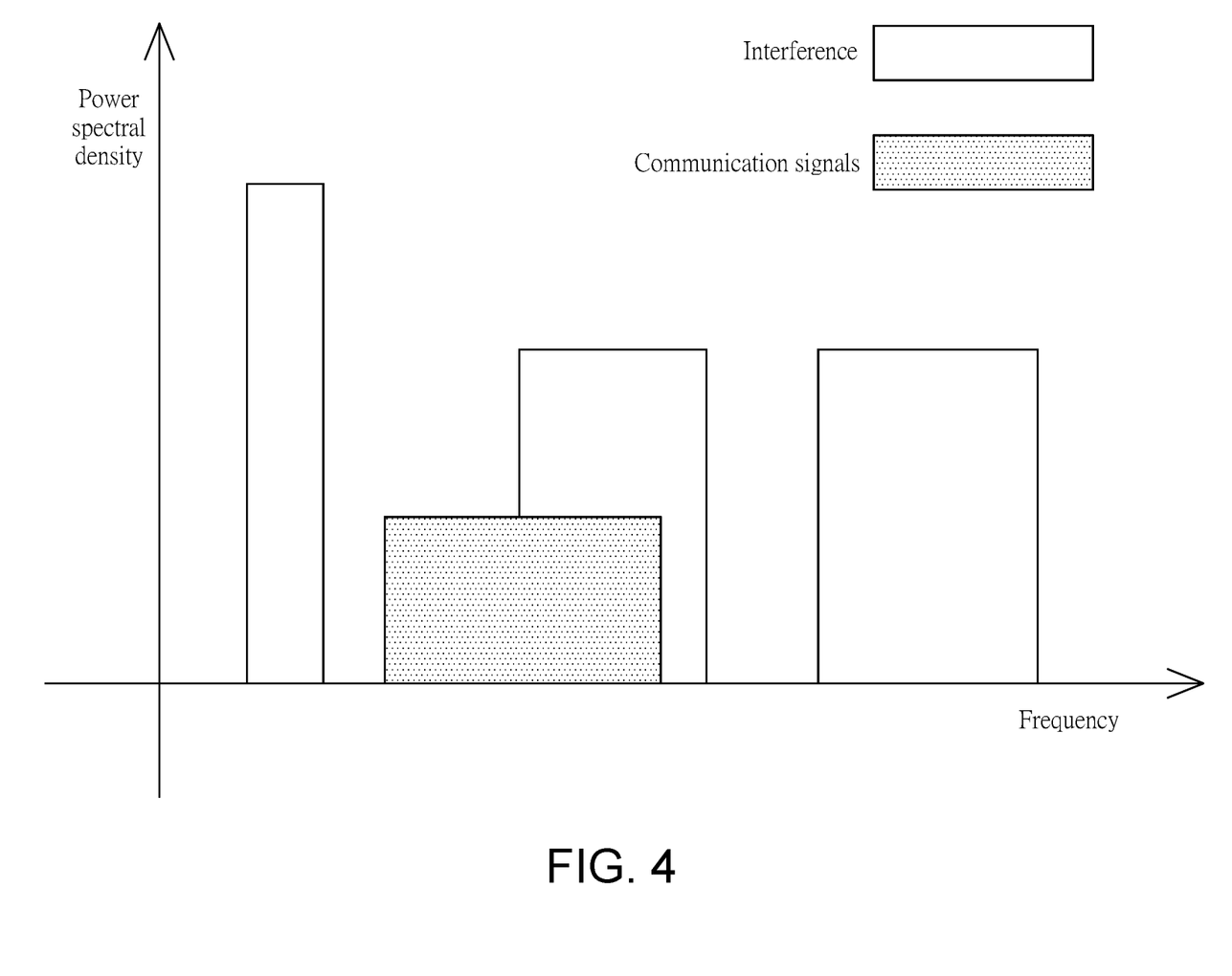
FIG. 4 illustrates a communication mode of a traditional communication system with spectrum interferences in one embodiment of the present disclosure.
Figure 5:
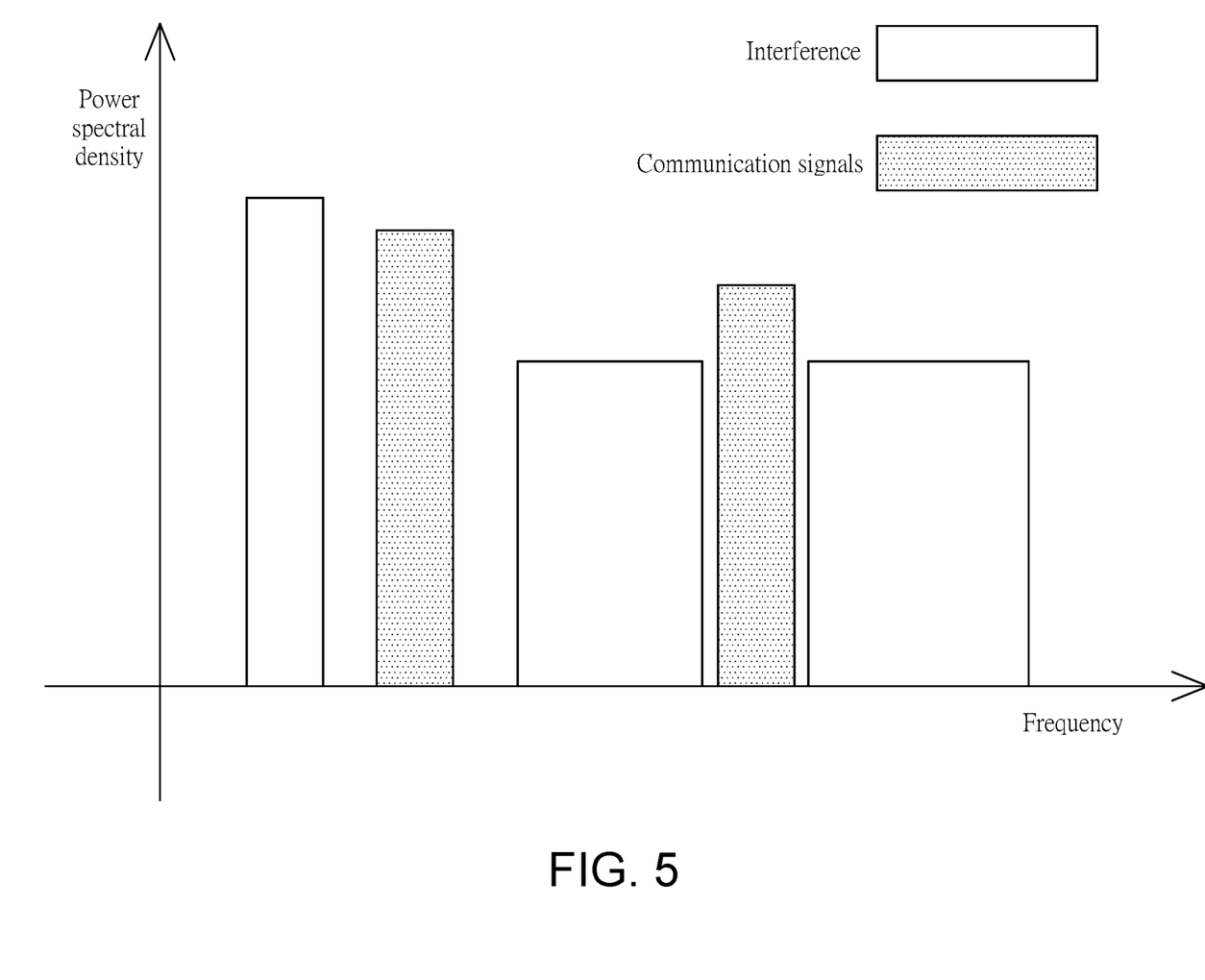
FIG. 5 illustrates an anti-interference communication mode after sub-carrier index modulation in one embodiment of the present disclosure.
Figure 6:
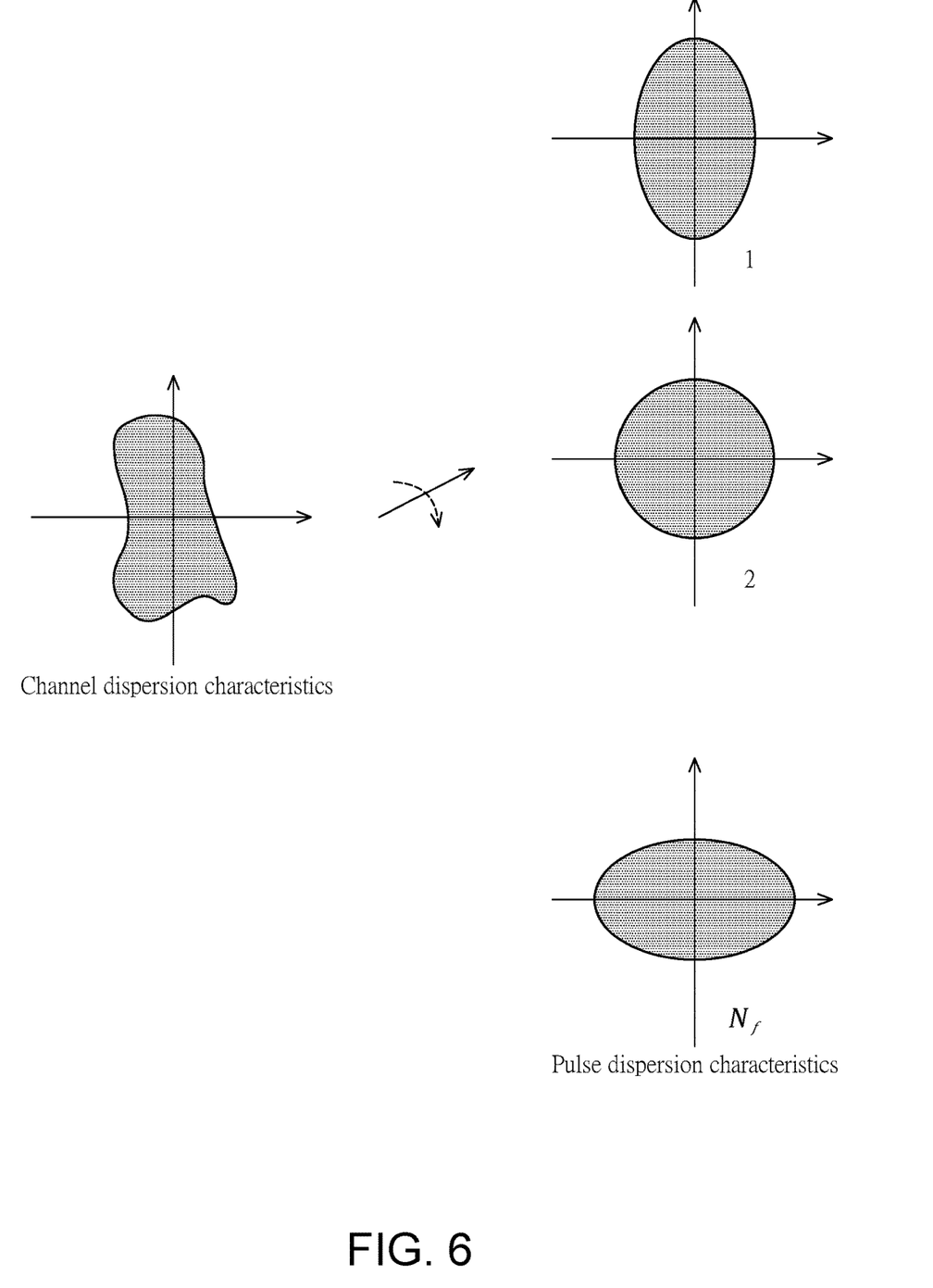
FIG. 6 illustrates is a schematic diagram of a matching of prototype pulses and channel expansion characteristics in one embodiment of the present disclosure.

In the embodiments of the present disclosure, the communication scenario with multi-band narrowband interference is further considered as illustrated in FIG. 4, the unprocessed communication signals overlap with the spectrum of the interference signals, which causes interference and reduces the quality of the communication. As illustrated in FIG. 5, a multi-band narrowband interference avoidance is capable of being implemented by using the sub-carrier index modulation, which improves the effectiveness and reliability of the underwater acoustic communication. The filter bank prototype pulse adaptation is further considered as illustrated in FIG. 6, so that the dispersion characteristics of the current filter bank pulse cover the dispersion characteristics of the current underwater acoustic channel. To sum up, the underwater acoustic communication system based on the filter bank joint sub-carrier multidimensional index modulation adopted by the present disclosure has a great improvement on the performance thereof.

Although the embodiments of the present disclosure are described in combination with the drawings, for a person skilled in the art, some modifications and variations can be made without departing from the concept of the present disclosure, which are all within the protection scope of the present disclosure.

What is claimed is:

1. An underwater acoustic communication system based on a filter bank joint sub-carrier multidimensional index modulation, comprising a transmitting terminal and a receiving terminal;
   the transmitting terminal includes a prototype pulse index module, a bit shunt, a carrier state index module, a constellation mapping module, a Filter bank multi-carrier (FBMC) block generator and a filter bank modulation module;
   the receiving terminal includes an equalizer, a detector, a decoder and a bit combiner;
   bit input signals are taken as input signals of the prototype pulse index module and input signals of the bit shunt, respectively; output signals of the prototype pulse index module are transmitted to the filter bank modulation module; output signals of the bit shunt are transmitted to the carrier state index module and the constellation mapping module, respectively; output signals of the carrier state index module and output signals of the constellation mapping module are all transmitted to the FBMC block generator; output signals of the FBMC block generator are transmitted to the filter bank modulation module; output signals of the filter bank modulation module are taken as output signals of the transmitting terminal; and
   the output signals of the transmitting terminal are taken as input signals of the equalizer; output signals of the equalizer are transmitted to the detector; output signals of the detector are transmitted to the decoder, output signals of the decoder are transmitted to the bit combiner, and output signals of the bit combiner are taken as output signals of the receiving terminal.

2. The underwater acoustic communication system based on the filter bank joint sub-carrier multidimensional index modulation according to claim 1, wherein the detector includes a prototype pulse detection module, a sub-carrier basis function module, a FBMC block classifier, a carrier state detection module, and a symbol detection module;
   the decoder includes a filter index decoding module, a sub-carrier index decoding module and a constellation symbol decoding module; and
   the output signals of the equalizer are transmitted to the prototype pulse detection module, output signals of the prototype pulse detection module are transmitted to the sub-carrier basis function module; output signals of the sub-carrier basis function module are transmitted to the FBMC block classifier and the filter index decoding module, respectively; output signals of the FBMC block classifier are transmitted to the carrier state detection module; output signals of the carrier state detection module are transmitted to the symbol detection module; output signals of the symbol detection module are transmitted to the sub-carrier index decoding module and the constellation symbol decoding module, respectively; and output signals of the sub-carrier index decoding module, output signals of the constellation symbol decoding module and output signals of the filter index decoding module are all transmitted to the bit combiner.

3. A communication method for the underwater acoustic communication system based on the filter bank joint sub-carrier multidimensional index modulation according to claim 1, comprising a transmitting method and a receiving method; wherein
   steps of the transmitting method are that:
   Step 1, selecting, by a part of bits in a transmitted binary bit stream, an activated prototype pulse index, evenly grouping, through a bit shunt and all sub-carriers, remaining bits, selecting, by a part of bits in each group, an activated sub-carrier index, mapping, after a quadrature amplitude modulation, the part of bits to activated sub-carriers, and forming complete transmission data by each group of data after passing through a FBMC block generator; and
   Step 2, interleaving, for a 1/2 period, a real part and an imaginary part of a mapped complex constellation symbol with each other, conducting, through a filter selected by the prototype pulse index in the Step 1, a filter bank multi-carrier modulation, forming transmission signals and sending the transmission signals into an underwater acoustic channel for transmission; and steps of the receiving method are that:
Step 3, demodulating and decoding, at a receiving terminal, received symbols after a channel equalization, and eventually combining outputs to restore an original transmitted binary bit stream.

4. The communication method for the underwater acoustic communication system based on the filter bank joint sub-carrier multidimensional index modulation according to claim 3, in the Step 1, a total number of the sub-carriers M and a total number of input bits A in a system are determined according to communication requirements, wherein $p_1$ bits are for selecting an activated filter prototype pulse index, and remaining B bit information is divided into G groups through the bit shunt and the sub-carriers, bit information $p=p_2+p_3$ in each group is mapped to a sub-carrier group with a length of K, $A=p_1+B=p_1+(p_2+p_3)G$, $G=M/K=B/p$; only L sub-carriers in each group are activated for transmitting a constellation symbol, and remaining silent sub-carriers are zeroed, $p_2$ bits are for select the activated sub-carriers index, and $p_3$ bits are modulated to active sub-carriers after being formed into a complex symbol through a constellation mapping.

5. The communication method for the underwater acoustic communication system based on the filter bank joint sub-carrier multidimensional index modulation according to claim 4, wherein each part of the bits are $p_1=\lfloor \log_2 N_f \rfloor$, $p_2=\lfloor \log_2 C_K^L \rfloor$, $p_3=L \log_2 Q$, where $\lfloor \cdot \rfloor$ represents a floor function, that is a bit number of $p_1$ depends on all alternative prototype filter types $N_f$, a bit number of $p_2$ depends on all possible sub-carrier combinations $C_K^L$, a bit number of $p_3$ depends on a number L of the active sub-carriers in each group and a modulation dimension Q of the constellation mapping.

6. The communication method for the underwater acoustic communication system based on the filter bank joint sub-carrier multidimensional index modulation according to claim 4, wherein the $p_1$ bits are output as an activated filter serial number $F_H \in [1,2,K,N_f]$ of a n-th FBMC symbol after passing through the prototype pulse index module; the $p_2$ bits are output as an activated sub-carrier serial number $I_g=\{i_{g,1},i_{g,2},K, i_{g,L}\}$, $i_{g,l} \in [1,2,L,K]$, $g=1,K,G$ and $l=1,K,L$ after passing through the carrier state index module; and the $p_3$ bits are output as L symbols $s_g=\{s_{g,1},s_{g,2},K,s_{g,L}\}$, $s_{g,l} \in \zeta$, $g=1,K,G$ and $l=1,K,L$ after the constellation mapping, where $\zeta$ represents a Q-dimensional constellation set.

7. The communication method for the underwater acoustic communication system based on the filter bank joint sub-carrier multidimensional index modulation according to claim 3, wherein output data for the FBMC block generator in the Step 1 are $x=[x(0),K,x(M-1)]$, $x(m) \in \{0,\zeta\}$ and $m=0,K,M-1$.

8. The communication method for the underwater acoustic communication system based on the filter bank joint sub-carrier multidimensional index modulation according to claim 3, wherein composite index modulated transmission signals modulated by a basis function $g_n(t)$ of a No. $F_n$ filter in the Step 2 are represented as $$s(t) = \sum_{m=0}^{M-1} \sum_{n=0}^{+\infty} e^{j2\pi m v t} e^{j\varphi_{m,n}} \left\{ a_{m,n} g_n(t-nT) + j b_{m,n} g_n\left(t - \frac{T}{2} - nT\right) \right\},$$

where an additional phase is $$\varphi_{m,n} = \frac{\pi}{2} m,$$

a sub-carrier interval v and a symbol period T satisfy $v=1/T$, $a_{m,n}$ and $b_{m,n}$ are a real part and an imaginary part of $x(m)$, a part of $a_{m,n}$ and $b_{m,n}$ are capable of being 0 because of an introduction of the silent sub-carriers.

9. The communication method for the underwater acoustic communication system based on the filter bank joint sub-carrier multidimensional index modulation according to claim 3, wherein in Step 3, an equalization result $\bar{y}$ of received signals is sent to the detector, and a detection process is divided into following steps:
Step 1, conducting a prototype pulse detection, determining, by a maximum likelihood detection, filter bank basic function index information $\hat{F}_n$, and conducting a filter bank demodulation on $\hat{y}$;
Step 2, obtaining, through a FBMC block classifier, each group of the received signals $y_1 \sim y_G$; and
Step 3, conducting, by grouping, a sub-carrier state detection, determining, by a maximum likelihood criterion, active sub-carrier index information $\hat{I}_g$ in each group, and taking data symbols carried on active sub-carriers as a constellation symbol $\hat{s}_g$ to be decoded at the same time.

10. The communication method for the underwater acoustic communication system based on the filter bank joint sub-carrier multidimensional index modulation according to claim 3, in Step 3, $\hat{F}_n$, $\hat{I}_g$ and $\hat{s}_g$ are inputted to the filter index decoding module, the sub-carrier index decoding module and the constellation symbol decoding module respectively to obtain corresponding bits, the corresponding bits are combined through the bit combiner to obtain a restored transmitted bit stream.

* * * * *